Oct. 16, 1928.

M. BORNKESSEL 1,688,113

SURGICAL HEADLIGHT

Filed June 9, 1927    2 Sheets-Sheet 1

INVENTOR.
Max Bornkessel
BY
ATTORNEY

Oct. 16, 1928.  M. BORNKESSEL  1,688,113
SURGICAL HEADLIGHT
Filed June 9, 1927  2 Sheets-Sheet 2
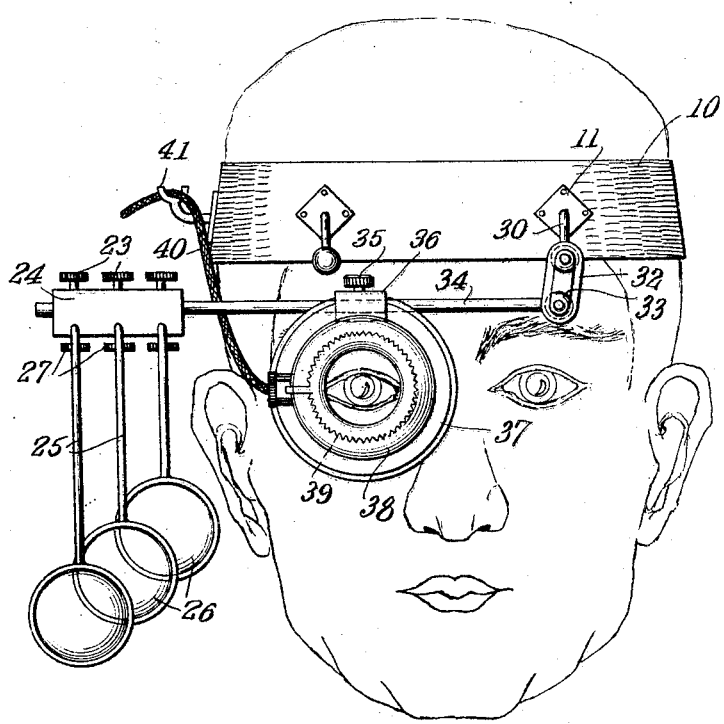
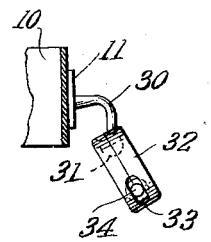
INVENTOR.
Max Bornkessel
BY
ATTORNEYS.

Patented Oct. 16, 1928.

1,688,113

UNITED STATES PATENT OFFICE.

MAX BORNKESSEL, OF NEW YORK, N. Y.

SURGICAL HEADLIGHT.

Application filed June 9, 1927. Serial No 197,751.

This invention relates to head-lamps with particular reference to such as are used for diagnostical purposes.

In the past such devices, as used in medical surgical and dental practice, have been found deficient due to inadequate adjustability, and range of action.

In addition the usual lamps of this type have been of a complicated nature and it has been noted that the illumination obtained is not sufficient by itself to permit an operator to note and discern with sufficient exactness, infections existing in the mouth cavity, and other parts under examination.

It is therefore the main object of this invention to overcome the foregoing disadvantages by providing a simplified adjustable head-lamp, having a plurality of lenses each of which may be selectively brought into use in a speedy manner.

Another aim is in the provision of means insertable between the eye and the illumination element adapted to adjust the working position between the mentioned members.

A further feature is in the provision of a pair of lamps, disposed one on each side of the examining eye and focussed on the point where the light is required in such manner that no shadow intervenes.

These and those objects, which will become apparent as the description progresses, are accomplished by the novel construction, combination and arrangement of parts hereinafter described, and illustrated in the accompanying drawing, forming a material component of this disclosure, and in which:—

Fig. 3 is a view similar to Figure 1, showing a modified form of the invention.

Fig. 4 is a fragmentary, partial transverse sectional, partial side elevational view of the main adjusting means.

Figure 1:
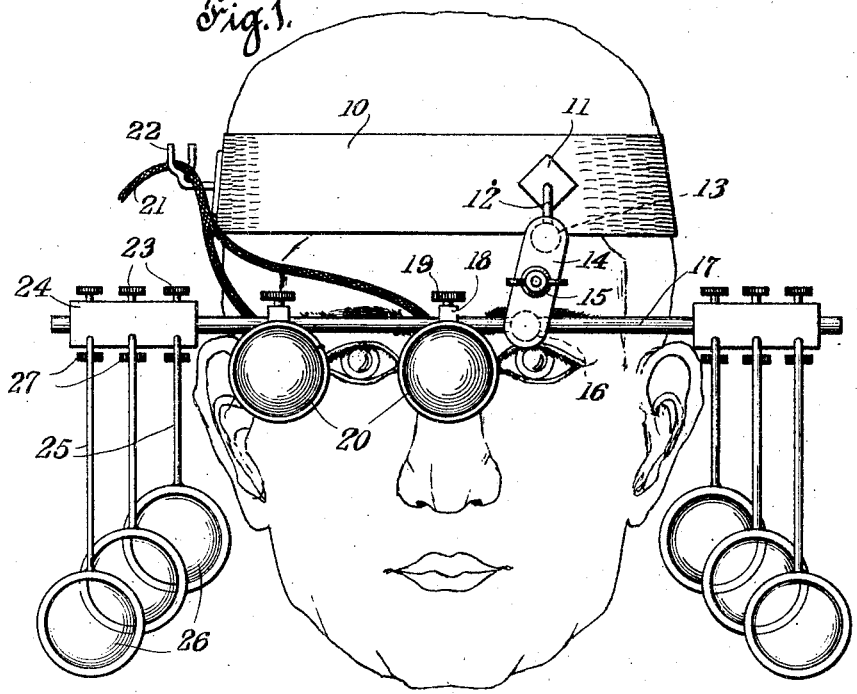
Fig. 1 is a front elevational view of a diagnostic head-lamp made in accordance with this invention and showing its adaption to an operator's head.
Figure 2:
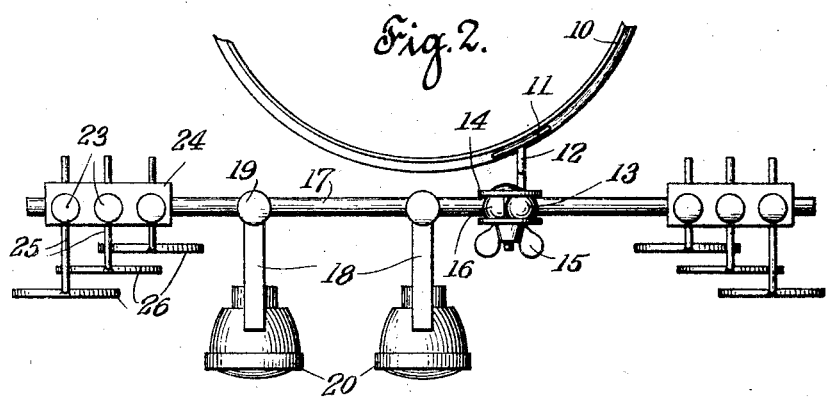
Fig. 2 is a fragmentary top plan view of the same.

In the drawing, the numeral 10 designates a head band, made preferably of hard rubber and shaped to conform with the contour of an operator's head, to which it may be secured.

Fixed on the band is a small metal plate 11, from which extends a substantially Z-shaped rod 12 having a ball 13 at its end frictionally engageable between, and at one end of, a pair of clamp plates 14, adjustable by a screw and wing nut 15, the lower end of the clamp engaging a similar ball 16 formed on a support rod 17, the whole constituting a double-ball, universal joint.

Extending outwardly on brackets 18, adjustable by set screws 19 on the rod 17, are a pair of electric lamps 20, usually positioned on either side of the examining eye, and supplied with current by a cable 21 supported on a hook 22 fixed to the side of the band 10.

Adjustably slidable on the outer ends of the support 17, and held by set screws 23, are bearings 24 in which are transversely movable and pivotally engaged, right-angularly bent rods 25 carrying at their free ends, lenses 26 of varying strength for a purpose later described, the adjusted positions of the lenses being maintained by set screws 27.

Thus, the band 10 is engaged on the head of the operator and the lamps 20 are adjusted to their proper positions on the rod 17, at the sides of the examining eye.

By swinging any of the lenses 26 upwardly in front of the examining eye, and inwardly or outwardly as the case may be, the proper focus may be procured to examine the interior of the patient's nose, throat, etc.

It will be noted that every element in the ensemble is adjustable and the support 17 carrying the lighting instruments are universally adjustable by means of the double-ball joint 13 to 16.

In the modification shown in Figs. 3 and 4, the plate 11 has extending outwardly and downwardly therefrom, a rod 30 having a ball 31 at its end, frictionally engageable in an elliptical socket 32, receptive of a second ball 33 formed on the end of a support rod 34 extending laterally and carrying the same lenses arrangement as described in the preferred embodiment.

Longitudinally adjustable on the rod 34, is an outreaching bracket 36, provided with a clamp screw 35 and carrying a rim 37 in which is fixed an apertured, tubular, glass casing 38 having mounted therein a filament 39 connected by a cable 40 to a source of electrical current, the cable being supported by a hook 41 fixed to the band 10.

Thus, the illumination element is adjusted on the rod 34 so that the focal rays of the examining eye pass through the aperture of the casing 38 and the lenses 26 are then swung into position to adjust the working position of the eye relative to the light.

It will be noted that in both forms, there is a space between the lamps and the eye thus protecting the latter from infectious bacterial germs that may be entrained in the air.

It will also be seen that because of the entire adjustability of the device, the operator will be able to examine any parts of the patient's nose, throat, etc., no matter what the angle may be.

From the foregoing, it is obvious that a simple device has been disclosed for the purpose stated and while the preferred embodiments have been shown and described, obviously others may be made without the exercise of invention and within the scope of the appended claims.

Having thus described my invention, what I claim as new and desire to secure by Letters Patent, is:—

1. A diagnostic head-lamp comprising a head band, a double-ball joint on said head band, a support rod carried by said double-ball joint, a plurality of electric lamps longitudinally adjustable on said rod, and a plurality of lenses longitudinally and pivotally adjustable on said rod, said lenses being adapted to selectively swing in front of the operator's eye.

2. A diagnostic head-lamp comprising a head band, a double-ball joint on said head band, a support rod carried by said double-ball joint, a pair of spaced electric lamps longitudinally adjustable on said rod, said lamps consisting of a rim, an apertured tubular glass casing in said rim, and a filament in said casing, a bearing longitudinally slidable on said rod, and a plurality of lenses of varying capacity pivotally adjustable in said bearing, said lenses being adapted to swing intermediate an operator's eye and the object on which the lamps are focussed.

Signed at New York, county of New York and State of New York, this 13 day of May, 1927.

MAX BORNKESSEL.